Dec. 29, 1959  V. E. SUOMI ET AL  2,919,083
BALLOON STRUCTURE AND METHOD OF LAUNCHING THE SAME
Filed March 12, 1956  3 Sheets-Sheet 1
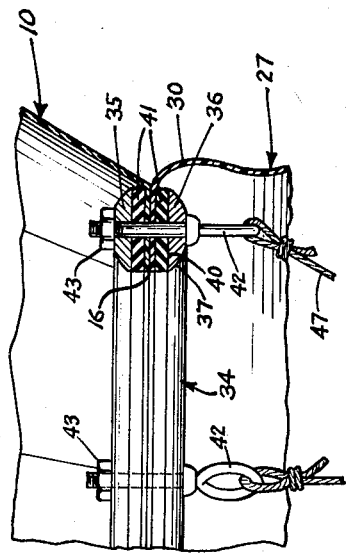
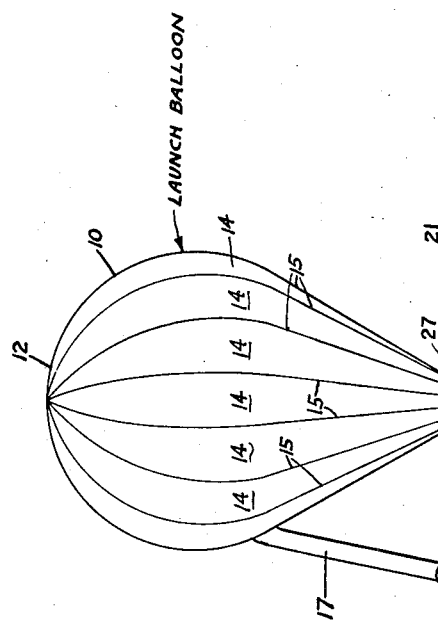
INVENTORS
VERNER E. SUOMI
OTTO C. WINZEN
BY
Paul, Moore & Dugger
ATTORNEYS

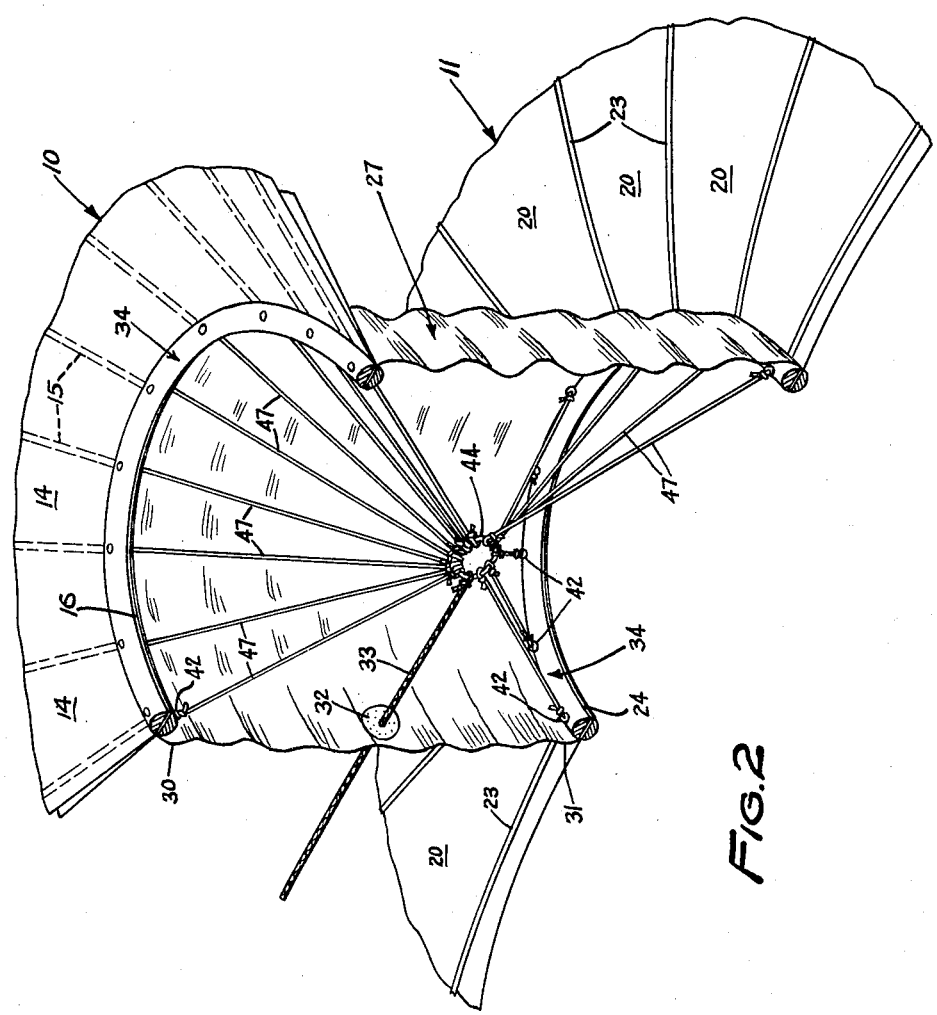

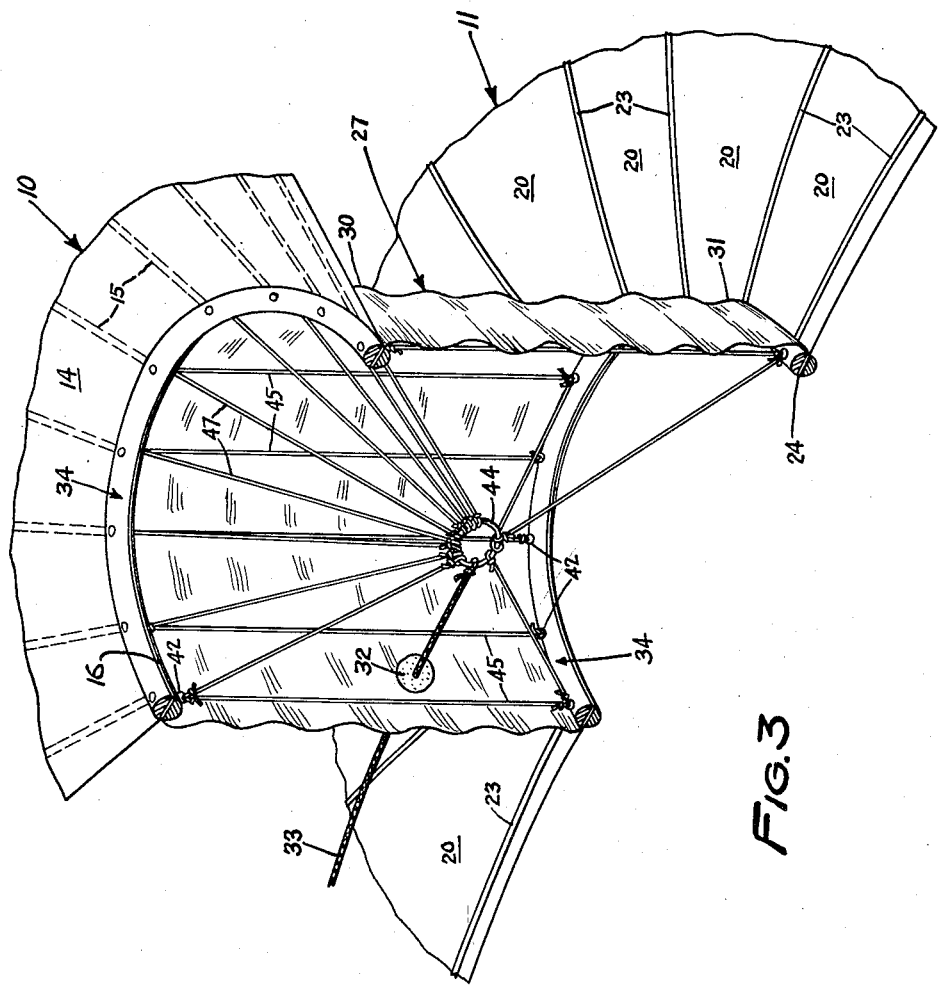

United States Patent Office 2,919,083
Patented Dec. 29, 1959

2,919,083

BALLOON STRUCTURE AND METHOD OF LAUNCHING THE SAME

Verner E. Suomi, Madison, Wis., and Otto C. Winzen, Mendota Township, Dakota County, Minn., assignors to Winzen Research, Inc., Minneapolis, Minn., a corporation of Minnesota Application March 12, 1956, Serial No. 570,942

4 Claims. (Cl. 244—31)

The invention of this application comprehends improvements in balloon structure and method of launching the same.

During the inflation and launching, commonly called ground handling of balloons, and particularly of large balloons such as the synthetic resinous stratosphere type, it is a problem to bring the balloon from its collapsed or uninflated position on the launching surface to an airborne inflated condition without the utilization of elaborate and expensive launching equipment, experienced personnel, considerable consumption of time and often times failure of the balloon envelope. Further, it is at this time that the balloon undergoes its most severe stresses, caused by concentrated high gas pressures and acceleration of the launching itself.

These difficulties may be overcome by the utilization of the instant balloon structure and launching method whereby a separate, or launch balloon, is initially inflated, the launch balloon is securely anchored to the ground during inflation and subsequently released for elevating the entire balloon train.

Broadly speaking, the balloon structure of the instant invention comprises a first or launching balloon usually of rugged construction and smaller than the main or trailing balloon, attached to the trailing balloon by a gas conducting tubular member; the method of the instant invention comprises the extension of a main balloon upon a supporting surface, the anchoring of a separate launch balloon to the apex end thereof, connecting the two balloons by a gas conducting duct, anchoring the launched balloon firmly to the supporting surface, inflating the launch balloon and quickly releasing the balloon train.

It is a principal object of this invention to provide a new balloon and method of launching which eliminates the difficulties of launching and this is achieved by providing a separate launching balloon, inflated separately, attached to the apex of a larger or main balloon, so that the launching can be effected with a minimum of accelerations on the main balloon which will inflate from the launch balloon as the balloon train ascends.

Other objects of this invention are to produce a new and useful balloon structure comprising a launch and main balloons connected by gas conduit; to provide a new and useful auxiliary launch balloon; to provide new and useful connecting structure for connecting a launch balloon to the main balloon; to provide a new and useful method of launching a balloon, eliminating initial stress upon the balloon due to high gas pressure and launching acceleration and eliminating excessive failure due to the handling at the time of launching the balloon.

Other objects of the invention reside in the structural details of the balloon structure, and the gaseous conduit structure and connecting means therefor, and to the specific launching steps.

Still other objects are apparent and inherent in the invention as described, illustrated and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings in which corresponding numerals refer to the same parts and in which:

Figure 1 is an elevational view of the instant invention after the launch balloon has been inflated and prior to ascension of the balloon train;

Figure 2 is a fragmentary perspective view of the launch and main balloons of this invention connected by a duct and in prolongation;

Figure 3 is a view similar to Figure 2 but showing a modified form of connection; and Figure 4 is an enlarged fragmentary detailed view showing one of the connecting members of the instant invention.

Reference is now made to the drawings and particularly to Figure 1. The balloon train 10—11 of the instant invention comprises a first or launch balloon generally designated 10 and secured at its appendix by a duct member 27, to the apex of the second or main balloon generally designated 11. Various types of launch and main balloons may be used within the spirit and scope of this invention. In the preferred form, as shown, the balloons comprise substantially identical construction with the launch balloon 10 being of smaller diameter and of heavier envelope construction than the main balloon 11. As shown in Figure 2, the launch balloon comprises a double ply envelope and as shown in Figure 3, it comprises a single ply envelope. In the preferred form shown, each balloon comprises a flexible, inflatable gasproof envelope, usually, although not necessarily, including a plurality of vertically extending gores extending from the apex end of the balloon toward the appendix end thereof.

Either one of the balloons 10 or 11 may be made according to Patent No. 2,526,719, being appropriately chosen as to size and ruggedness as aforesaid, although it is to be understood that other type balloons may be likewise used.

As shown in Figure 1, the balloon 10 comprises a flexible inflatable gas-proof envelope including a plurality of vertically extending gores 14 extending from the apex end 12 to the appendix end 13 thereof. The gores are sealed together along adjacent edges to form junctures. In this instance the gores are comprised of synthetic resinous material such as polyethylene and are heatsealed along their junctures to provide a gas-proof envelope. Other materials may be used to provide the gores and while it is preferable to use a balloon envelope made from a plurality of gores, other envelopes may be used.

The plurality of gores 14 are joined together throughout adjacent edges to provide junctures over which the reinforcing strips or load tapes 15 are positioned. The load tapes themselves form no part of this invention per se and may be omitted if desired. However, it has been found preferable to use them, particularly for the launch balloon since they add strength to the balloon envelope. In this instance, the load tapes generally comprise a reinforcing tape of polyethylene or the same synthetic resinous material as the gores 14 are composed of, and preferably have a plurality of filamentatious re-enforcing members therein, as in accordance with the co-pending application, Serial No. 489,374, filed February 21, 1955, now Patent No. 2,858,090, of Otto C. Winzen et al. while the load tapes 15 are preferably thermally secured to the gore junctures, they may be adhesively secured if so desired.

Each of the gores 14 and the load tapes 15 terminate at the appendix end, at an edge 16 as shown best in Figures 2 and 3. At the apex end 12 the gores are joined together suitably to provide a gas-proof closure.

In one of the gores, approximately mid-way between the appendix end 13 and the apex end 12, there is provided an aperture communicating with a tubular inflation duct 17 (Figure 1), duct 17 forming an elongated cylindrical section having one end thermally or adhesively secured to the gore to communicate with the interior of the balloon. Through this tube or duct 17 the balloon 10 is inflated, and after inflation of the balloon 10 the inflation tube 17 may be tied off as desired.

Likewise, as shown in Figure 1, the balloon 11 comprises a flexible inflatable gas-proof envelope including a plurality of vertically extending gores 20 extending from the apex end 21 to the appendix end 22 thereof. The gores are sealed together along adjacent edges to form junctures, the junctures being overlaid with reinforcing or load tapes 23 similar to tapes 15.

Each one of the gores and tapes terminate at the apex at the edge 24 and is secured at the bottom to a load harness 25 of any suitable type such as shown in the aforesaid Patent No. 2,526,719, for example.

The load harness 25 is attached by a flexible cable 26 to the load to be supported during flight.

The appendix of the launch balloon 10 and the apex of the main balloon 11 are joined so that there is provided a balloon train 10—11 having a gas containing structure formed by the envelope of balloon 10, the envelope of balloon 11 and a connecting duct 27.

Duct 27 comprises a gas-proof tubular or cylindrical member, joined at one end 30 to the balloon 10 and at the other end 31 to the balloon 11. The duct or member 27 is provided with a grommet, or diaphragm 32 of resilient material for providing a substantially gas-proof seal for tie-down member or line 33 as subsequently explained.

While the duct 27 may be thermally or adhesively secured to the balloon envelopes, in this instance, as shown in Figure 4, it is secured by clamping ring assemblies 34 as shown. Since these assemblies are identical, only the clamping ring assembly that secures duct 27 to the balloon 10 will be described. Assembly 34 comprises a first ring 35 and identical second ring 36. Each of the rings 35 and 36 is provided with an outwardly convex surface 37 and a flat inner surface 40, the flat surfaces facing one another and the convex surfaces being oppositely and outwardly directed. Each of the rings is provided with a plurality of apertures spaced for congruency when the rings are in the position of Figure 4.

The end 30 of duct 27 is turned inwardly or leftwardly with reference to Figure 4 as is the appendix end of the balloon 10. The turned ends are seated in abutment as shown in Figure 4 and provided with a plurality of apertures corresponding to the apertures in the rings 35 and 36. A pair of flat annular resilient gaskets 41, having likewise cooperating apertures are positioned one to underlie the turned portion of the duct 27 and one to overlie the turned portion of the balloon 10 as shown in Figure 4. A plurality of eye-bolts 42 are then passed through the cooperating apertures in the rings 35 and 36, gaskets 41 and turned portions of duct 27 and balloon 11, and secured in position by nuts 43.

The duct 27 is secured in identical fashion to the apex of balloon 11 except that, of course, the eye-bolts 42 for the ring assembly for balloon 11 are directed so that, as seen in Figures 2 and 3, they may be joined by connecting lines to the eye-bolts 42 for the ring assembly for balloon 10.

Secured to each one of the eye-bolts 42 is a flexible line or cord 43 secured at the other end to a center harness ring 44. Likewise secured to a harness ring 44 is the flexible tie-down cable 33, which as shown in Figure 1, serves to anchor the balloon to the ground during the inflation of the launch balloon 10.

In the modification shown in Figure 3, in addition to the flexible cable members 47, there are provided additional parallel cables 45 each parallel cable joining cooperating and oppositely disposed eye-bolts 42, as shown.

As will be appreciated with reference to Figure 1, when the balloon train is to be launched, it is laid out in extended relation upon the ground or other supporting surface, and cable 32 is anchored to the supporting surface. Balloon 11 may be either a closed appendix balloon or an open appendix balloon, as desired. The load to be supported is attached to cable 26 for the balloon 11 and the balloon 10 is inflated through duct 17 to the position of Figure 1, at which time it is restrained from ascent by the cable or tie-down line 33, the resilient diaphragm or grommet 32, usually of rubber preventing the escape of gas from a balloon train 10—11. The gas in the balloon 10 will be confined by the envelope formed by gores 20 of balloon 11. However, at this time, very little gas will be communicated through duct 27 to balloon 11. The base harness formed by the members 47, 44, and 45 will securely join the two balloons together. After inflation duct 17 is tied off, sealed or suitably closed, the member 33 is severed, allowing the balloon train to rise and gradually the gas from the balloon 10 will flow into the larger or main balloon 11 and balloon 10 will partially or completely collapse and lie upon the apex of the larger balloon 11.

Of course, it is to be appreciated that while the preferred form of duct and base harness for connecting balloon 10 and 11 is shown, other forms of duct and harness may be made within the spirit and scope of this invention.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A balloon train comprising in combination a first launch balloon including an inflation duct for inflating the same, clamping means connected to the appendix of said launch balloon, a second or main balloon, clamping means connected to the apex of said main balloon, a tubular duct secured by said clamping means to said first and second balloons, said balloons being apertured so as to provide a gas-proof closure together with said tubular duct, harness means joining said first and second clamping means and interior of said duct, securing means joined to said harness means and penetrating said duct, a substantially gas-proof closure positioned to said duct to prevent escape of gas at the point of penetration of said securing means.

2. A balloon train comprising in combination a first launch balloon including an inflation duct for inflating the same, a second or main balloon, a tubular duct secured to said first and second balloons, said balloons being apertured so as to provide a gas-proof closure together with said tubular duct, harness means joining said first and second mentioned balloons, securing means joined to said harness means and penetrating said duct, a substantially gas-proof closure positioned to said duct to prevent escape of gas at the point of penetration of said securing means.

3. A balloon train comprising in combination first and second balloon envelopes connected by a restricted gas conducting member, said first and second envelopes each having an apex and an appendix end, said gas conducting member joining the appendix end of the first balloon to the apex end of the second balloon and means for inflating said first balloon apart from said restricted gas conducting member.

4. The method of launching a balloon having an apex end and an appendix end which comprises securing a second balloon by its appendix end to the apex of said first balloon by a restricted conduit, extending the train of balloons thus provided with said first and second balloons in prolongation upon a supporting surface, inflating said second balloon between said conduit and the apex thereof, releasing said second balloon as it is inflated and permitting it to extend vertically, connecting said train to said supporting surface substantially only at said conduit and releasing said connection to release said train after said second balloon is inflated.

References Cited in the file of this patent

UNITED STATES PATENTS

| D. 59,719 | Colvin | Nov. 22, 1921 |
| 1,485,577 | Witten | Mar. 4, 1924 |
| 1,572,187 | Cooper | Feb. 9, 1926 |
| 2,635,834 | Huch | Apr. 21, 1953 |

FOREIGN PATENTS

| 576,953 | France | May 23, 1924 |